United States Patent [19]

Rakcevic

[11] 4,004,605
[45] Jan. 25, 1977

[54] RELIEF VALVE FOR FLUIDS

[75] Inventor: Savo Rakcevic, Ljubljana, Yugoslavia

[73] Assignee: Titovi Zavodi Litostroj Ljubljana n.sol.o., Ljubljana, Yugoslavia

[22] Filed: Dec. 19, 1975

[21] Appl. No.: 642,348

Related U.S. Application Data

[63] Continuation-in-part of Ser. No. 492,877, July 29, 1974, abandoned.

[30] Foreign Application Priority Data

Aug. 2, 1973 Yugoslavia ............. 2100/73

[52] U.S. Cl. ............. 137/219; 137/556; 251/31
[51] Int. Cl.² ............. F16K 31/124
[58] Field of Search ......... 137/219, 220, 221, 222, 137/556, 556.3, 556.6; 251/31

[56] References Cited

UNITED STATES PATENTS

| | | | |
|---|---|---|---|
| 3,014,493 | 12/1961 | Seger | 251/31 X |
| 3,704,856 | 12/1972 | Swiecicki | 137/219 X |
| 3,824,033 | 7/1974 | Chacour | 137/219 X |

FOREIGN PATENTS OR APPLICATIONS 248,594  3/1926  United Kingdom ............. 137/219

Primary Examiner—Alan Cohan
Assistant Examiner—Gerald A. Michalsky
Attorney, Agent, or Firm—Karl F. Ross; Herbert Dubno

[57] ABSTRACT

A pressure-relief valve especially for use in dams and other hydraulic-turbine installations has a deflecting member that diverts an axially flowing stream outwardly at the discharge side of the valve. This valve has two fluid-operated servomotors, one responding to the water pressure in the system and the other to the pressure of a control fluid. These servomotors are hydraulic cylinders mounted on diametrically opposite hollow ribs inside the housing of the valve body and have pistons interconnected by a common piston rod. An indicating rod extends radially from this piston rod through one of the hollow ribs, and the feed lines for the two cylinders also extend out through these ribs.

10 Claims, 7 Drawing Figures

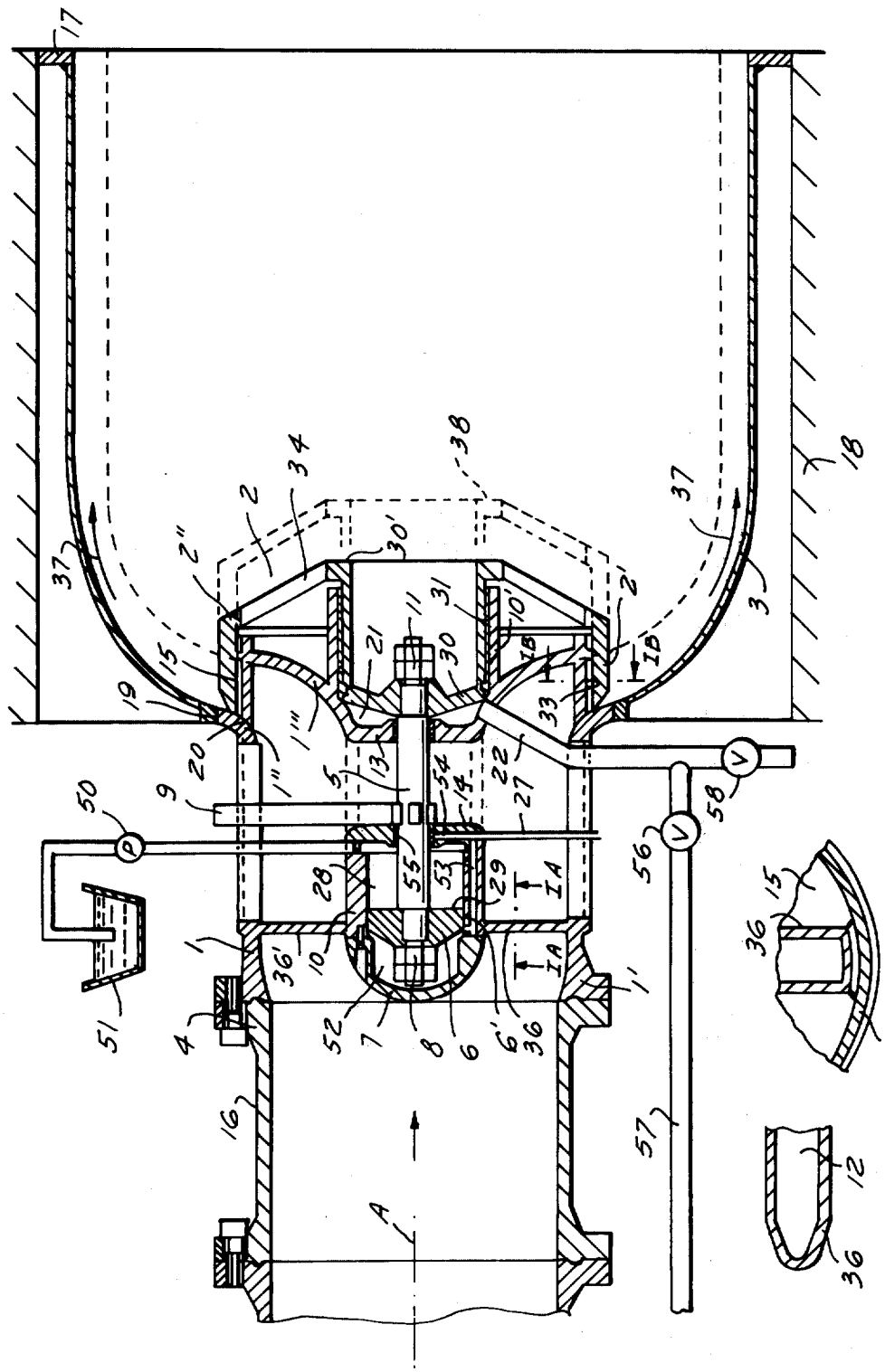

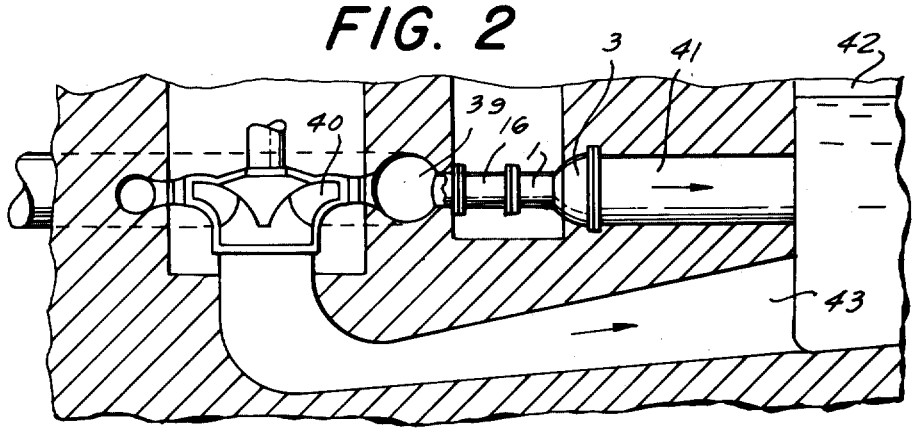
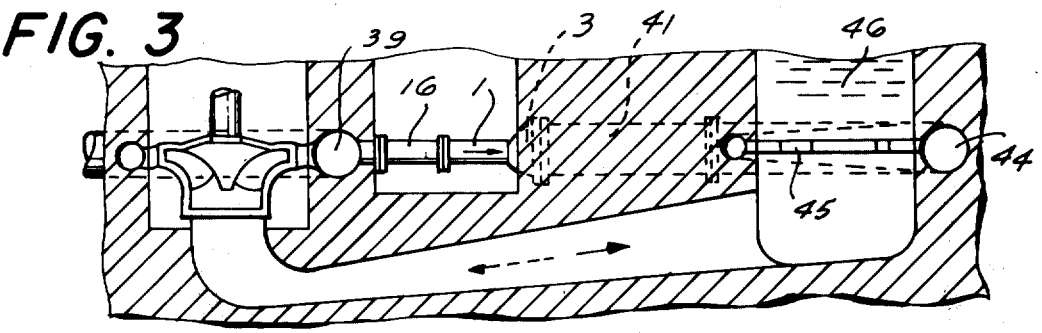
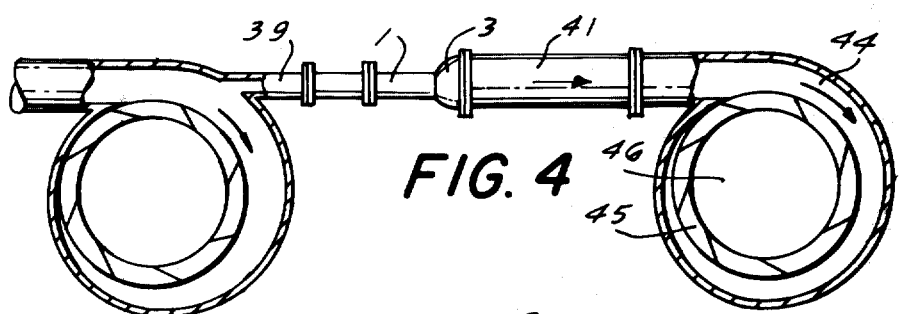
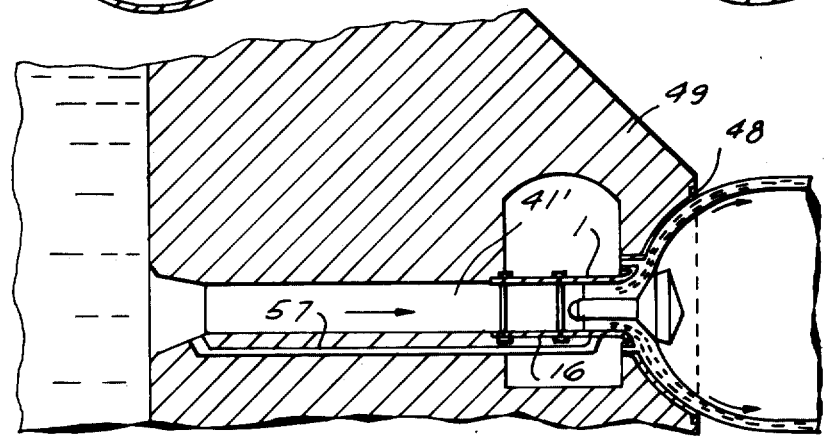

RELIEF VALVE FOR FLUIDS

CROSS-REFERENCE TO RELATED APPLICATION

This is a continuation-in-part of my copending patent application Ser. No. 492,877 filed July 29, 1974, now abandoned.

FIELD OF THE INVENTION

The present invention relates to a valve. More particularly this invention concerns a remotely controllable valve for use in controlling a liquid in a hydroelectric power plant.

BACKGROUND OF THE INVENTION

A relief valve is known in which a servomotor has the shape of an annular ram with an annular cylinder located on the circumference of a discharge tube and has an annular piston which is axially movable by means of a fluid medium different from that flowing through the flow passage constituted by the discharge pipe. This piston is fixed to a cylindrical valve element which is axially displaceable toward and away from a conical water-flow deflector lying on the axis of the pipe so as to open and close the annular outlet defined in part by this conical deflector. The conical deflector itself is placed at the junction between a narrow inlet pipe and a wide outlet pipe and is intended to deflect the inflowing water outwardly so as to dissipate the kinetic energy of the discharge water. During closing the cylindrical valve element of this relief valve moves in the direction of flow of the water passing through the valve and when the annular outlet is partially opened, the valve body protrudes from the smaller pipe into the larger pipe so as to obstruct the flow of water in a stream having an annular cross section at this point.

This arrangement has several disadvantages. First of all in a partially open condition of the valve the cylindrical valve element protrudes from the smaller pipe into the larger pipe and obstructs the flow in the cup-shaped water stream by creating a so-called shadow between the outer surface of the cylindrical valve element and the contour of the transitional area between the smaller pipe and the larger pipe. This creates vortices and underpressures that produce vibration. To suppress underpressures in this shadow space air must be supplied. Furthermore because of the above-mentioned shadow in the flow of discharge water between the outlet side of the cylindrical outwardly protruding closing element and the contour of transition of the smaller pipe into the larger pipe, it is not possible to increase the diameter of the larger pipe beyond a certain degree because the shadow in the water flow becomes too large and increases underpressure, eddying, and vibration. Double-sided guiding of the cylindrical closing element in the annular cylinder of the servomotor has the consequence that water-pressure caused deformation, which is higher with large-diameter pipes, attains a very high value interfering with sliding of the closure element.

It has been suggested to avoid this by limiting stress and providing an exceptionally stiff and, consequently, heavy structure at a considerable increase of cost of the valve and transportation and mounting thereof. The known relief valve also has various technical difficulties. For instance a precise machining of sealing and guiding surfaces, which is essential, is an extremely tedious and expensive job due to the large sealing and guiding surfaces. In order to obtain good sliding the large sliding surfaces must be made of various high-quality and expensive materials.

OBJECTS OF THE INVENTION

It is an object of the present invention to provide an improved valve.

Another object is to provide an improved relief valve which overcomes the above-given disadvantages.

Yet another object is the provision of such a valve which is of relatively low manufacturing cost and relatively low weight.

SUMMARY OF THE INVENTION

These objects are attained by the relief valve according to this invention by providing near one end of its cylindrical casing or housing along its central axis a cylinder of a servomotor secured by means of two radially disposed hollow ribs extending for the most part over the whole length of the casing. The servomotor is operated by the discharge fluid and has a bottom passing into a flow-deflecting trumpet-shaped cover which diverges outwardly toward the circumference of the casing where it radially passes the casing, thereby closing the fluid-discharge passage axially and forming an annular radially open outlet. At the junction of the trumpet-shaped cover with the casing there is therefore a circumferential opening which is only interrupted at two points by the above-mentioned hollow and radially extending ribs which are connected to the mantle of the trumpet-shaped cover and the bottom of the cylinder of the servomotor. This latter servomotor is arranged on the opposite side of the trumpet-shaped cover and is constantly acted upon by the constant-pressure discharge fluid via a line connected well upstream of the valve.

According to other features of this invention there is provided at the opposite axial end of the casing and also mounted on the hollow ribs a second servomotor which is operated by a control fluid different from the liquid passing through the housing. The two servomotors are interconnected by a piston rod, with the piston of the back servomotor being a component part of the closing body such that the cylindrical mantle is axially movably attached to the end of the cylindrical casing having the circumferential outlet opening. One or more indicators are fixed to the piston rod and protrude through the hollow ribs for the indication of the position of the closing element of the relief valve and for preventing rotation of axially movable parts of the relief valve.

Thus, in summary, the valve according to the present invention comprises a generally cylindrical housing having an axial flow passage defining an axis and having an axial input end and an axial outlet end. The passage is adapted to be axially traversed by water under pressure from the input end to the outlet end. A front cylinder is axially centered in the housing toward the input end and defines in the housing a closed front chamber. A pair of diametrically opposite and radially extending hollow ribs extend between the front cylinder and the housing to support this cylinder in the housing. Each of these hollow ribs has a respective hollow interior that opens radially outside the housing. A front piston in the front cylinder subdivides its chamber into a front compartment toward the input end and a rear compartment toward the outlet end. Means is provided for supplying oil under pressure through one of the hollow interiors of the ribs to the rear compartment to displace the front piston axially toward the input end, and means is provided for draining oil or other fluid from the front compartment through one of the hollow interiors. A radially outwardly flared deflector mounted on the ribs at the outlet end defines with the housing at the outlet end a generally annular and radially opening outlet. A rear cylinder is mounted on the ribs and defines an axially rearwardly open rear chamber axially centered on the housing at the outlet end. A rear piston is axially displaceable in this rear chamber and is connected via a rod lying on the axis to the front piston so that these two pistons are jointly axially displaceable. Means is provided for supplying the water under pressure to the rear chamber in front of the rear piston to urge the piston rearwardly. A sleeve-like valve body centered on the axis and carried on the rear piston closely surrounds the deflector and is axially displaceable between a back position leaving the annular outlet unobstructed and a forward position blocking the annular outlet and preventing fluid flow through the passage. An indicating member has an inner end secured to the rod and extends radially from the rod through one of the interiors outside the housing.

BRIEF DESCRIPTION OF THE DRAWING

FIG. 1 is an axial section through the valve according to this invention;

FIGS. 1A and 1B are sections taken along lines IA—IA and IB—IB, respectively;

FIG. 2 is a schematic illustration of the connection of the relief valve of FIG. 1 between the spiral casing of a hydraulic machine and a tail water reservoir;

FIG. 3 is a schematic illustration of the connection of the relief valve of FIG. 1 between a spiral casing of a pump-turbine hydraulic machine and a discharge directing spiral casing for combining two differently directed jets;

FIG. 4 is a plan view partly broken away of the connection of a relief valve to the spiral casing of the hydraulic machine and the discharge-directing spiral casing of FIG. 3; and FIG. 5 is a schematic illustration in axial section of a relief valve mounted in a dam.

SPECIFIC DESCRIPTION

FIG. 1 shows a relief valve having a cylindrical housing or casing 1 having a central axis A and provided at its downstream or outlet end with a cylinder 10' forming a part of a ram 30' secured in the housing 1 on the axis A by means of two radially extending hollow ribs 36 and 36' which themselves extend substantially the full length of the casing 1. The servomotor or ram 30' has an end plate 13 which is unitary with a trumpet-shaped cover or deflector 1''' diverging circumferentially toward the casing 1 so as to axially block off the outlet end of this casing 1.

A pair of outlets 15 together form an annular radially open outlet between the cover 1''' and the wall of the casing 15 which is only interrupted by the two diametrically opposite hollow ribs 36 and 36' which are joined to the trumpet-shaped cover 1''', to the bottom 13 of the cylinder at 10', and to the walls of the casing 1.

At the inlet end of the housing 1, also mounted on the ribs 36 and 36' and centered on the axis A is another cylinder 10 of another ram or servomotor 6' which is operated by hydraulic oil rather than by the fluid in the valve like the servomotor 30'. A piston 6 subdivides the chamber of the servomotor 6' and is connected by means of a rod 5 to the piston 30 of the ram 30', with nuts 8 and 11 bolting the pistons 6 and 30 to this rod 5 which itself lies on the axis A.

The piston 30 is also part of a closing body 2 formed as a cylindrical sleeve or mantle 2' which is axially shiftable relative to the cylindrical casing 1 over the outlets 15 and is integral with the piston 30 of the servomotor 30'. In addition the closing body 2 is formed with pressure-relief openings 34. The valve body 2 has surfaces 33 and 31 which slide on the casing 1 and on the cylinder 10', respectively, for guiding and sealing the discharge fluid. In addition at least one indicator rod 9 has its inner end connected to the rod and extends radially outwardly through the hollow interior of one of the hollow ribs 36 or 36' so as to indicate the axial position of the closing body 2 and prevent rotation of the axially movable parts 6, 5, and 2.

The rear compartment of the cylinder 10 of the servomotor 6' is connected by a pipeline 23 to a reversible pump 50 fed oil from a supply 51 so that this pump can be operated to pressurize this compartment 28 and move the piston 6 axially forwardly. In addition the front compartment 52 is externally vented through a channel 53 formed in the cylinder 10 and a drainline 27 extending outwardly through the interior of the rib 36. Another channel 54 terminates at the packing 55 surrounding the rod 5 where it exits from the cylinder 10 so that any oil in the chamber 28 leaking forwardly past the piston 6 into the front compartment 52 under the cover 7 or backwardly into the seal 55 is collected in the channels 53 or 54 and drains out via the line 27, thereby preventing hydraulic oil from entering the water flowing through the valve.

The compartment 21 in front of the piston 30 is fed fluid via a line 22 which is connected either via a valve 56 and a pipeline 57 to the conduit well upstream of the valve (see FIG. 5) or via another valve 58 to the atmosphere. The pipeline 22 also passes through the hollow interior of the rib 36.

The casing or housing 1 is provided adjacent the servomotor 6' with a flange 1' fixed to a corresponding flange 4 of an inlet feed pipe 16. On its side towards the servomotor 30' it is formed with a flaring region 1'' having an inner wall 20 of curvature and shape congruent to the confronting face of the deflector 1'''. A flange 19 of a large-diameter outlet tubing 3 normally secured via concrete into a wall 18 continues the curve of this surface 20 and is normally connected via a flange 17 to further conduits or the like.

FIG. 2 shows how the relief valve may be connected between the spiral casing 39 of a hydraulic machine 40 and the tail-water of the tail-race channel 42. Thus the casing 1 of the relief valve is connected to the spiral casing 39 by the feed pipe 16 and to the discharge tube 41 leading to the tail-race channel 42 by means of a wide-diameter discharge part 3. Discharge water which has performed work in the turbine is led into the tail-race channel 42 by means of a siphon 43.

FIGS. 3 and 4 show the relief valve connected to the spiral casing of a pump-turbine machine and to the discharge-directing spiral casing in order to combine two differently directed jets. Thus this casing is connected to the spiral casing 39 of the hydraulic machine in an analogous manner to the arrangement shown in FIG. 2, with the feed pipe 6, and to the spiral casing 44 with the aid of the discharge part 3 and the discharge tube 41 for a rotational direction of the jet emerging from the relief valve. Thus the jet of discharge fluid reaches the spiral casing 44 for rotational direction where it is deviated into rotational movement and is discharged between guide vanes 45 into a discharge tube 46 so that it rotates around the vertical jet of that fluid part which flows out of the turbine through the siphon after having performed work and reaches the discharge tube 46 approximately vertically. Thus direct clash of two jets at a right angle is avoided and favorable flow conditions are attained during the operation of the pumping turbine machine and the relief valve in all operating conditions.

FIG. 5 shows the relief valve mounted in a dam 49. The casing 1 of the relief valve is at its one end connected to a pipe 41' for conducting water from a storage pond and at its other end to an opening 48 in the wall of the dam 49. It is advantageous for the use of the relief valve and dams that the closing body 2 is closed with water and opened with pressurized oil. Therefore it is necessary to supply water under pressure via the line 57 from the storage pond into the space 28 of the servomotor 6' to close the discharge opening 15 and it is necessary to supply oil under pressure into the space 21 of the servomotor 30' to open this.

The relief valve according to this invention operates as follows:

Closing body 2 of FIG. 1 is shown in solid lines in the fully closed position and in dashed lines in the open position. When the closing body 2 is in the closed position the space 28 of servomotor 6' is under constant pressure through the pump 50, this pressure acting on the back surface 29 of the piston 6 so that the closing force upon the closing body 2 is greater than the force of the discharge fluid in the space 21 of the servomotor 30'. Thus the closing body 2 closes the discharge opening 15.

When the pressure of the control fluid in the space 28 of the servomotor 6' is reduced so that the force upon the piston 30 of servomotor 30' becomes greater than the force upon piston 6 of the servomotor 6', the closing body 2 opens the discharge opening 15. Thus the discharge fluid is supplied under pressure to the space 21 of the servomotor 30' and at the same time control fluid is allowed to pass out of the space 28 of the servomotor 6'. This control fluid, hydraulic oil, which is forced out and whose pressure depends upon the force of fluid on the piston 30 of the servomotor 30' can be used for operation of other closing mechanisms, of the vane ring of the hydraulic machine for instance.

The pressure drop of the control fluid in the space 28 of the servomotor 6' can be avoided by preventing control fluid from being forced out and thereby opening the discharge opening 15. The discharge opening 15 is closed by supplying the control fluid into the space 28 of the servomotor 6'. Thus the discharge fluid is forced out of the space 21 of the servomotor 30' until the closing body 2 closes the discharge opening 15 at the surface 20 on the casing 1. It follows that the discharge opening 15 can be closed by the pressure control fluid by supplying same into the space 28 of servomotor 6'. The discharge fluid in the space 21 of the servomotor 31 constantly urges the piston 30 backwardly to open the outlet 15 which takes place when the pressure control fluid is allowed to drain out of the space 28 of the servomotor 6'. The effective surface area of the piston 30 is greater than that of the piston 6 because the pressure supplied by the pump 50 can easily be made to be considerably greater than that of the discharge fluid.

With the system according to the present invention the cylindrical mantle is relieved of pressure when open because approximately the same pressure is present on both sides of this mantle 2'. Since the cylindrical mantle or valve body 2' rests against the casing on one side, deformations normally occurring with very large diameters do not have any effect on the sliding as they are radially equal all around the valve body. Furthermore additional guiding of the axial movement of the closing body 2 with the aid of the piston 30, which is unitary with the closing body 2, presents no difficulty because the diameter of the cylinder of the piston is comparatively small. For this reason the desired tolerance can be obtained without difficulty in order to obtain a suitably smooth sliding of the closing body 2 without any risk of jamming due to deformation.

Furthermore as the influence of deformations upon a satisfactory guiding of the closing body 2 is eliminated by original design it is possible to use lighter than normal construction of the valve body, reducing manufacturing cost, transportation cost and installation cost. The easy motion of the various sliding elements allows a relatively small force to be used to open and close the valve. Furthermore there is no shadow space in the relief valve according to the present invention with respect to the flow of the discharge fluid at the transition between the discharge diameter of the casing 1 into the larger-diameter discharge part 2 even with the valve body 2 only partly open. Thus the flow lines of the flowing fluid at the transition from the smaller to the larger diameter remain mutually approximately parallel and do not drop off from the wall to provoke vortices and underpressures. Thus there is no need to provide an extra air supply to relieve underpressures.

Furthermore it is possible to service the valve according to the present invention merely by opening it and then gaining access via the hollow interiors of the ribs 36 and 36'. The piston 6 can be replaced and repacked without difficulty by removal of the rear cover 14 of the cylinder 10. Leakage from the chamber 21 is virtually irrelevant to the operation of the arrangement furthermore given the fact that the relief for discharge tube 27 of the servomotor 6 passes through the hollow rib 36 it is also possible to check leakages in this line with no difficulty.

I claim:
1. A valve for controlling water under pressure and comprising:
   a generally cylindrical housing having an axial flow passage extending along an axis and having an axial input end and an axial outlet end, said passage being axially traversed by said water under pressure from said input end to said outlet end;
   a front cylinder axially centered in said housing at said input end and defining in said housing a closed front chamber;
   a pair of radially extending hollow ribs bridging said front cylinder and said housing to support said cylinder in said housing and having respective hollow interiors opening radially outside said housing;
   a front piston in said front cylinder subdividing said front chamber into a front compartment toward said input end and a rear compartment toward said outlet end;
   means for supplying oil under pressure through one of said hollow interiors to said rear compartment to displace said front piston axially toward said input end;

means for draining a fluid from said front compartment through one of said hollow interiors;

a fixed radially outwardly flared deflector mounted on said ribs at said outlet end and defining with said housing at said outlet end an outwardly opening outlet of larger diameter than said input end;

a rear cylinder mounted on said deflector and defining an axially rearwardly open rear chamber lying along said axis;

a rear piston axially displaceable in said rear chamber;

a rod lying on said axis and connected to both of said pistons for joint axial displacement thereof;

a cylindrical valve sleeve centered on said axis and carried on said rear piston, said sleeve closely surrounding said deflector and axially displaceable between a back position unblocking said outlet and a forward position blocking said outlet and preventing water flow through said passage;

an indicating member having an inner end secured to said rod and extending radially therefrom through one of said interiors outside said housing; and means for supplying said water under pressure to said rear chamber in front of said rear piston to bias said sleeve toward said back position.

2. The valve defined in claim 1 wherein said ribs are diametrically opposite, axially elongated and extend generally the full axial length of said housing between said cylinders, said sleeve having a circular forwardly-facing axial sealing surface lying in a plane perpendicular to said axis and engageable with an outwardly flared portion of said housing to block said outlet.

3. The valve defined in claim 2 wherein said deflector is generally trumpet-shaped and formed as a body of revolution centered on said axis.

4. The valve defined in claim 3 wherein said outwardly flared portion confronts said deflector and is of the same shape as said deflector.

5. The valve defined in claim 2 wherein said means for supplying said water to said rear chamber in front of said rear piston includes a conduit extending through one of said hollow interiors.

6. The valve defined in claim 2 wherein said rear piston is of greater effective surface area than said front piston.

7. The valve defined in claim 2 wherein said indicating member is connected to said rod between said cylinders and extends straight radially from said rod.

8. The valve defined in claim 2 wherein said means for draining a fluid includes a conduit passing through one of said interiors.

9. The valve defined in claim 2 wherein said means for supplying oil includes a source of oil, a pump connected to said source, and a conduit between said pump and said rear compartment and passing through one of said hollow interiors.

10. The valve defined in claim 2 wherein said housing, said ribs, and said front and rear cylinders are all integral, and said rear piston and said valve sleeve are integral.

* * * * *